United States Patent

[11] 3,565,270

| [72] | Inventors | Nicholas R. Guilbert, Jr.<br>Glenside;<br>Louis P. Metz, Philadelphia, Pa. |
|---|---|---|
| [21] | Appl. No. | 705,034 |
| [22] | Filed | Feb. 13, 1968 |
| [45] | Patented | Feb. 23, 1971 |
| [73] | Assignee | Guilbert Incorporated<br>Philadelphia, Pa. |

[54] COUPLING FOR CARTS
8 Claims, 12 Drawing Figs.

[52] U.S. Cl. .................................................. 214/95,
214/730, 214/16.1
[51] Int. Cl. ................................................. B65g 47/00
[50] Field of Search .......................................... 214/95,
730, 16.16 (C), 38; 280/434

[56] References Cited
UNITED STATES PATENTS

| 1,084,820 | 1/1914 | Pescatoie | 280/434 |
|---|---|---|---|
| 1,410,935 | 3/1922 | Lazareth | 214/38 |
| 1,828,307 | 10/1931 | Been | 214/16.1 |
| 2,031,256 | 2/1936 | Dorsey | 280/434 |
| 2,545,696 | 3/1951 | Harvoot | 214/38 |
| 2,721,521 | 10/1955 | Mitchell | 104/48 |
| 2,786,590 | 3/1957 | Edwards et al. | 214/38X |
| 2,925,286 | 2/1960 | Hodges et al. | 280/434 |
| 3,432,055 | 3/1969 | Guilbert | 214/730 |

*Primary Examiner*—Gerald M. Forlenza
*Assistant Examiner*—Raymond B. Johnson
*Attorney*—Zachary T. Wobensmith, II

ABSTRACT: A coupling for carts that may be engaged with an angularly disposed cart, which returns the cart to a straight line and guides it onto and off a dumbwaiter car.

PATENTED FEB 23 1971   3,565,270

INVENTORS.
NICHOLAS R. GUILBERT
LOUIS P. METZ
BY
ATTORNEY

PATENTED FEB 23 1971 3,565,270

INVENTORS
NICHOLAS R. GUILBERT
LOUIS P. METZ
BY
ATTORNEY

INVENTORS.
NICHOLAS R. GUILBERT
LOUIS P. METZ

BY [signature]

ATTORNEY 3,565,270

COUPLING FOR CARTS

BACKGROUND OF THE INVENTION

1. Field of the Invention

This invention relates to mechanism for engaging and guiding a vehicle to a straight line path while moving the vehicle horizontally having provision for disengaging the vehicle at either end of the mechanism.

2. Description of the Prior Art

In the use of carts such as dumbwaiter carts to move articles from one location to another problems of control of cart movement onto and off dumbwaiter cars have arisen. Most carts have at least one if not two pairs of swivel wheels located at the front and rear of the cart respectively, which permits the cart to assume any position desired as it is being moved through doorways, halls and other narrow locations. One of the primary reasons for automatic loading and unloading of dumbwaiter carts has been the reduction in manual labor and consequently the number of persons required to operate the apparatus. With manual labor it is possible to guide the cart in a straight line down narrow passageways and onto the dumbwaiter car. However with automatic loading and unloading apparatus such as shown in prior U.S. Pat. No. 3,337,070, it is necessary that the cart be in a straight line with respect to the car so that it does not jam when entering or leaving the dumbwaiter car. One coupling which is suitable for such use is shown in prior application Ser. No. 616,240, filed Feb. 15, 1967, wherein there is provided a coupler that loads and unloads the cart in a straight line. That coupler is satisfactory so long as the cart is in line with the car, however the cart is often brought to the loading apparatus at an angle and may then jam and not load onto the car. The apparatus of application Ser. No. 616,240 will not release the cart for unloading at both ends of the dumbwaiter car, so that the cart must always be unloaded from one side.

The apparatus of the present invention will engage a cart at an angle to the apparatus, cause it to straighten out, move onto the dumbwaiter car and will permit the cart to be loaded or unloaded at either end of the car.

SUMMARY OF THE INVENTION

A coupling for carts is provided wherein the car coupling engagement assembly engages a coupler fitting on the cart which may be at an angle to the assembly and as the assembly and cart are drawn onto the dumbwaiter car they are forced into a straight line and aligned with the centerline of the car.

The principal object of the present invention is to provide a coupling for carts that will engage a cart which is angularly disposed with respect to the dumbwaiter car and will move it to an inline position with the car as it is being loaded thereonto.

A further object of the present invention is to provide a coupling for carts that permits the cart to be loaded or unloaded from either end of the dumbwaiter car.

A further object of the present invention is to provide a coupling for carts that guides the cart in a straight line while the cart is being loaded or unloaded.

A further object of the present invention is to provide a coupling for carts that may be used with a variety of types of carts and cart handling equipment.

A further object of the present invention is to provide a coupling for carts that is fast and positive in its operation.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 5A is a diagrammatic view of a portion of the apparatus of the present invention;

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Figure 1:
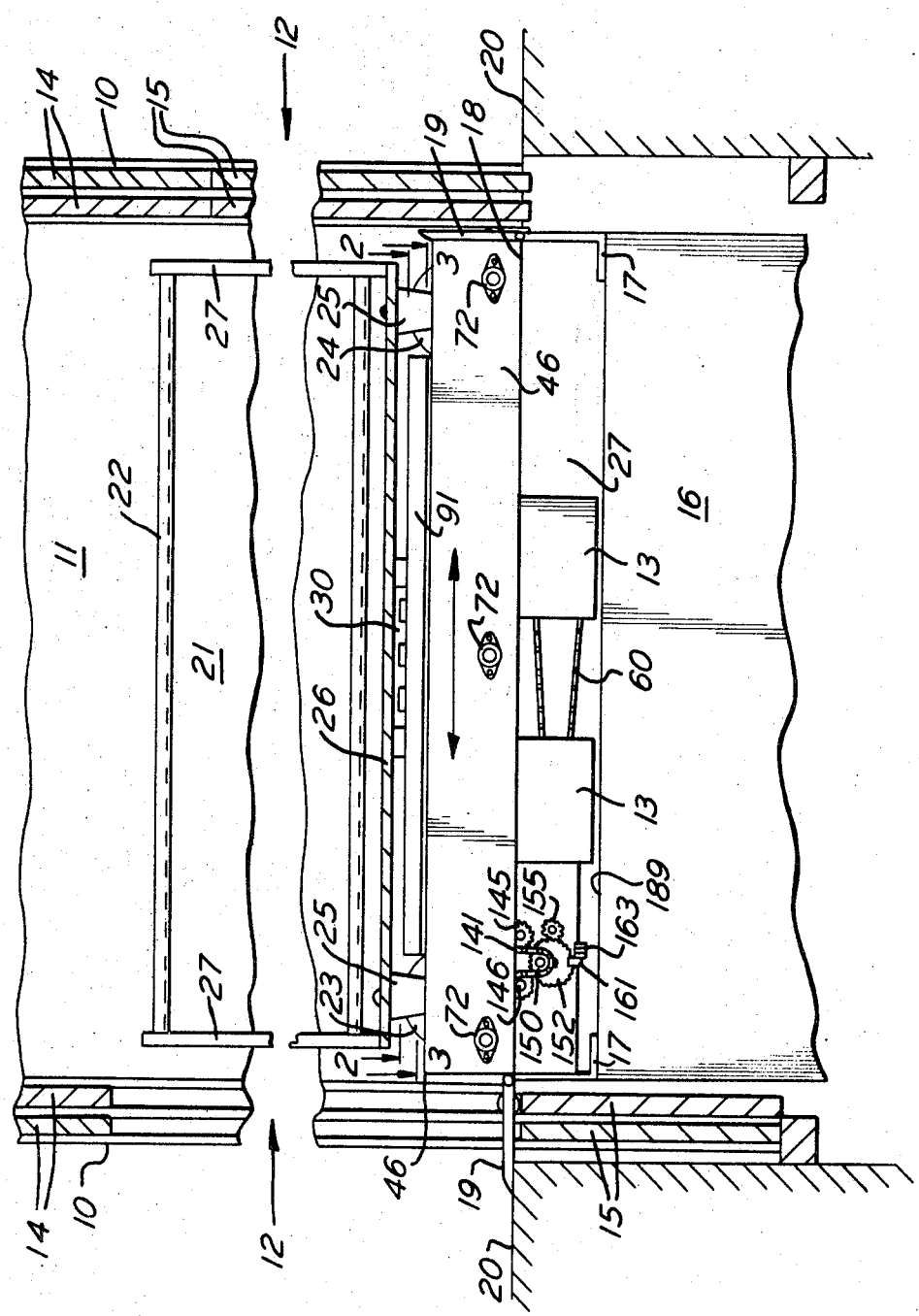
FIG. 1 is a vertical sectional view through a dumbwaiter hatchway showing a dumbwaiter car and a cart incorporating the apparatus of the present invention and taken approximately at a location corresponding to the line 1-1 of FIG. 2.
Figure 1A:
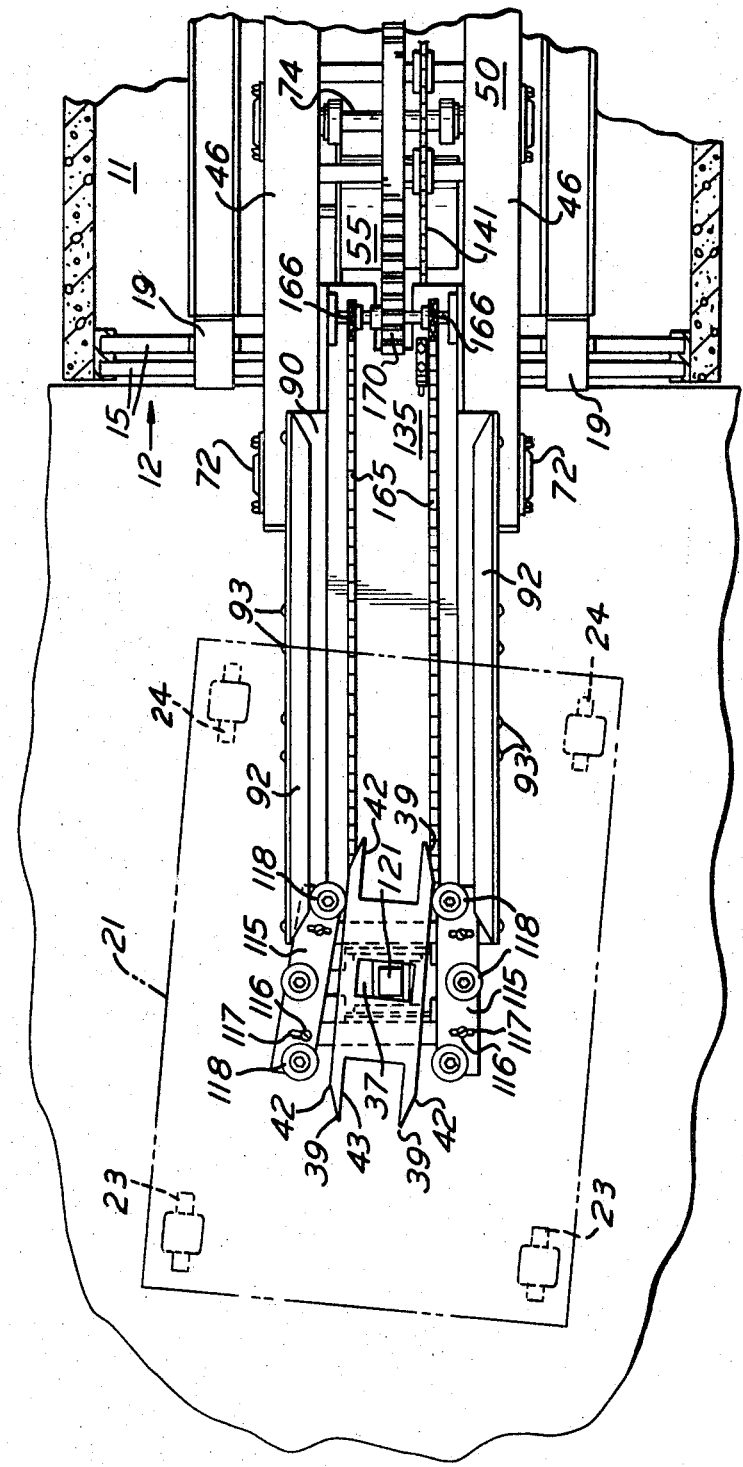
FIG. 1A is a fragmentary plan view, illustrating the loading of the cart onto the car.
Figure 2:
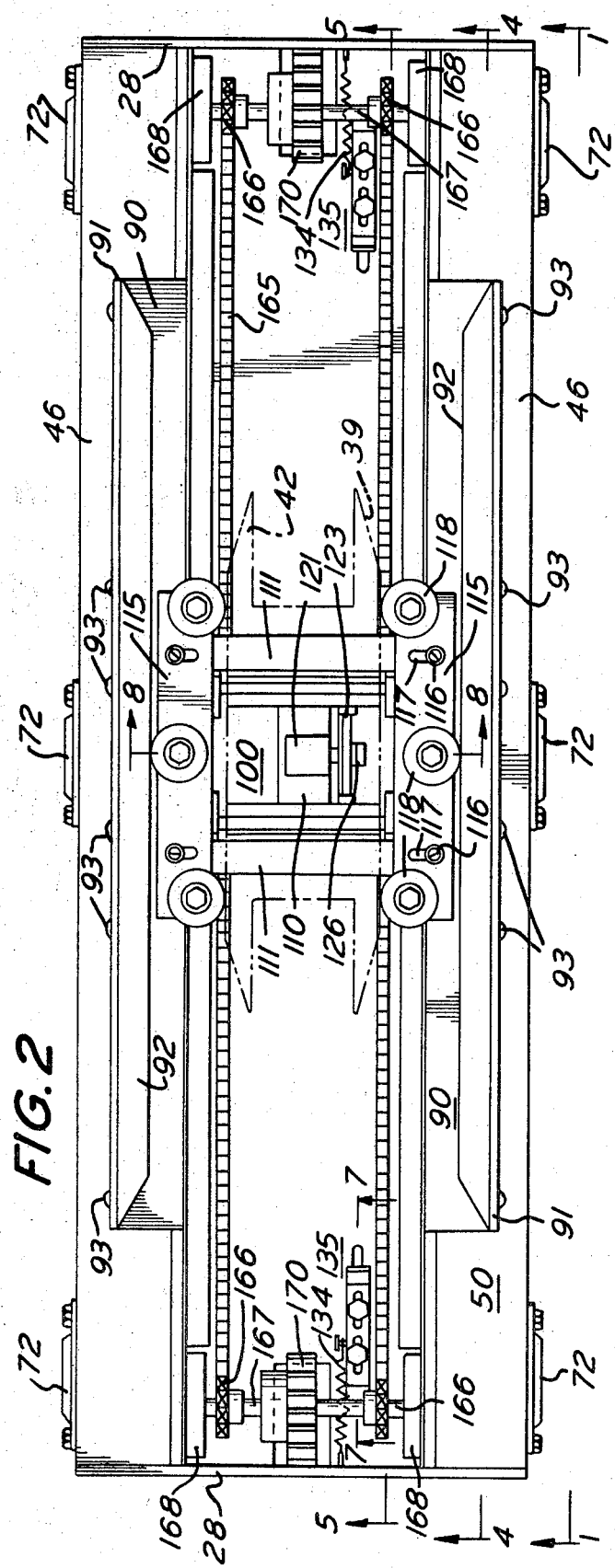
FIG. 2 is a horizontal sectional view taken approximately on the line 2-2 of FIG. 1.

Referring now more particularly to the drawings and FIG. 1 thereof, opposite parallel vertical walls 10 and one of the opposite vertical sidewalls 11 of a hatchway are shown, with access openings 12 through the walls 10, respectively. The access openings 12 are normally closed by pairs of upper and lower hatchway doors 14 and 15. The doors 14 and 15 are movable vertically and respectively upwardly and downwardly in a well known manner for access through the selected openings 12.

A dumbwaiter car 16, of well-known type, is shown in the hatchway, guided and movable vertically along guide rails (not shown) to selected access openings 12 by mechanism (not shown) of well-known type.

The car 16 has an upper horizontal bottom floor 18 and a lower horizontal bottom floor 18a with a frame 17 therebetween. A pivotally mounted drawbridge panel 19 is provided on the frame 17 at each end of car 16 to bridge the gap between the upper car floor 18 and the outer floor 20 of the landing outside of the hatchway when the car 16 is at an access opening 12.

A dumbwaiter cart 21 is provided, of well-known type, the cart having a frame 22, and a front and rear pair of rotatable swivel wheels 23 and 24 mounted by flanges 25 on vertical pivotal axes to the floor 26. The flanges 25 and wheels 23 and 24 can assume a variety of positions so that the cart 21 can be angularly related and moved as desired. The cart 21 has vertical ends 27 and other features common to dumbwaiter carts.

Figure 10:
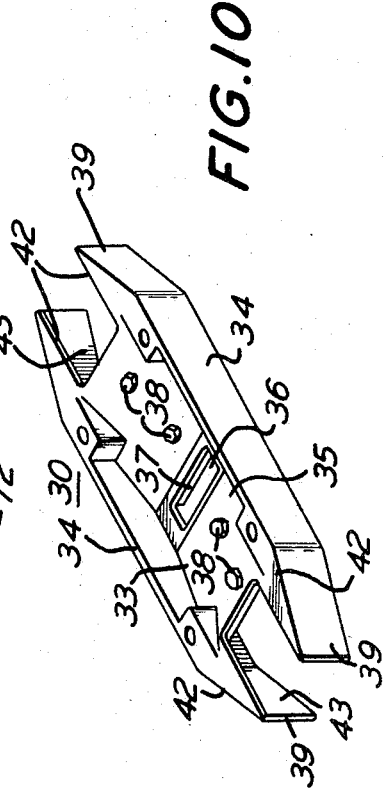
FIG. 10 is a view in perspective illustrating the portion of the coupling apparatus which is affixed to the dumbwaiter cart.
Figure 4:
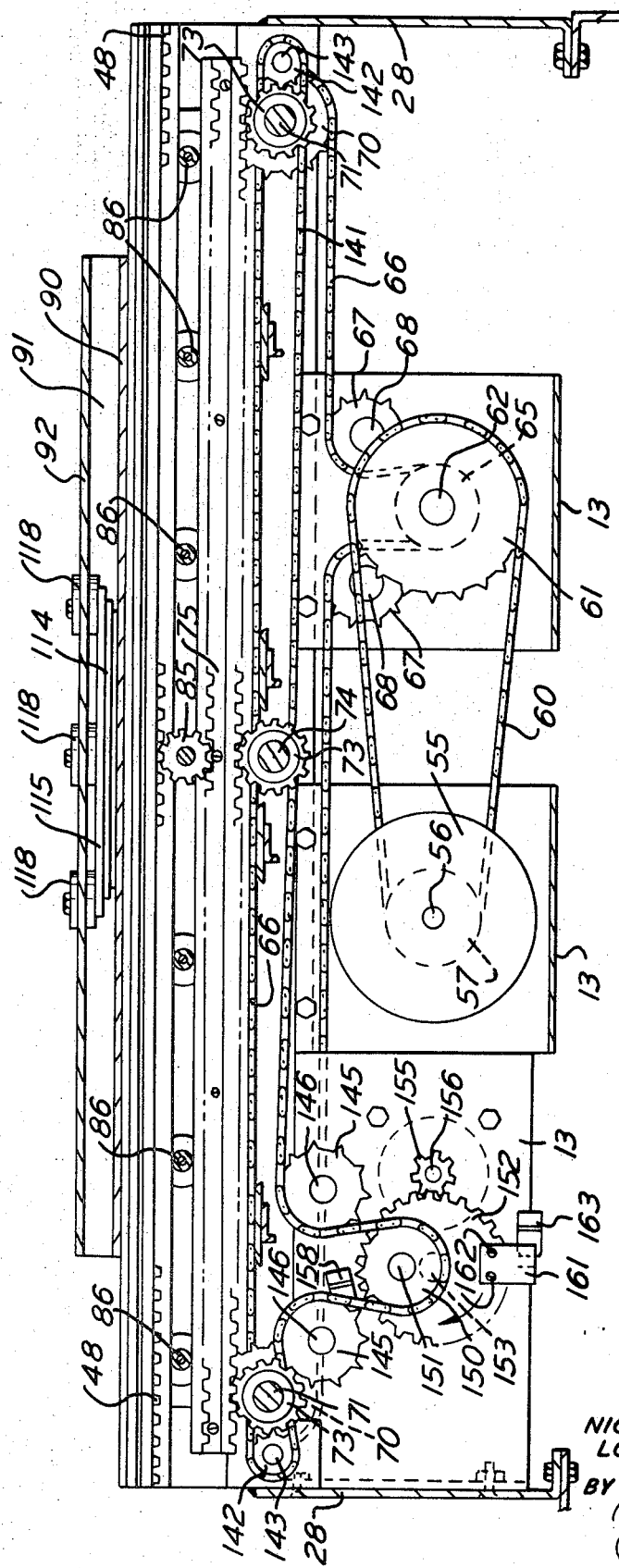
FIG. 4 is a vertical sectional view taken approximately on the line 4-4 of FIG. 2.
Figure 8:
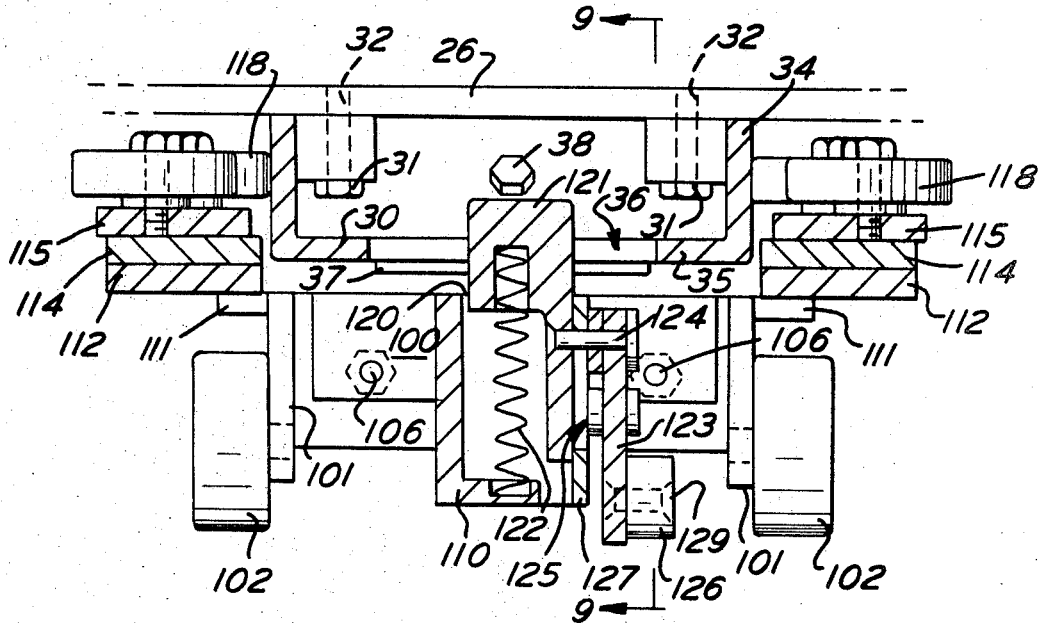
FIG. 8 is a vertical sectional view taken approximately on the line 8-8 of FIG. 2.

A coupler fitting 30 is provided as illustrated more fully in FIGS. 8 and 10. The fitting 30 is attached to the floor 26 of the cart 21 by four bolts 31 threadably engaged in holes 32 of floor 26.

The fitting 30 is of substantially rectangular shape with a center portion 33 having a pair of vertically extending ribs 34 at the outside connected by a concave center plate 35. The center plate 35 is provided with a rectangular central opening 36 and a pair of wear plates 37 on each side of opening 36 on the bottom of plate 35 thereof and held thereon by bolts 38.

A pair of cam plates 39 are provided at each end of fitting 30 which have flat top portions 42 and vertical inwardly extending cam portions 43 joined thereto and to the ribs 34.

Figure 6:
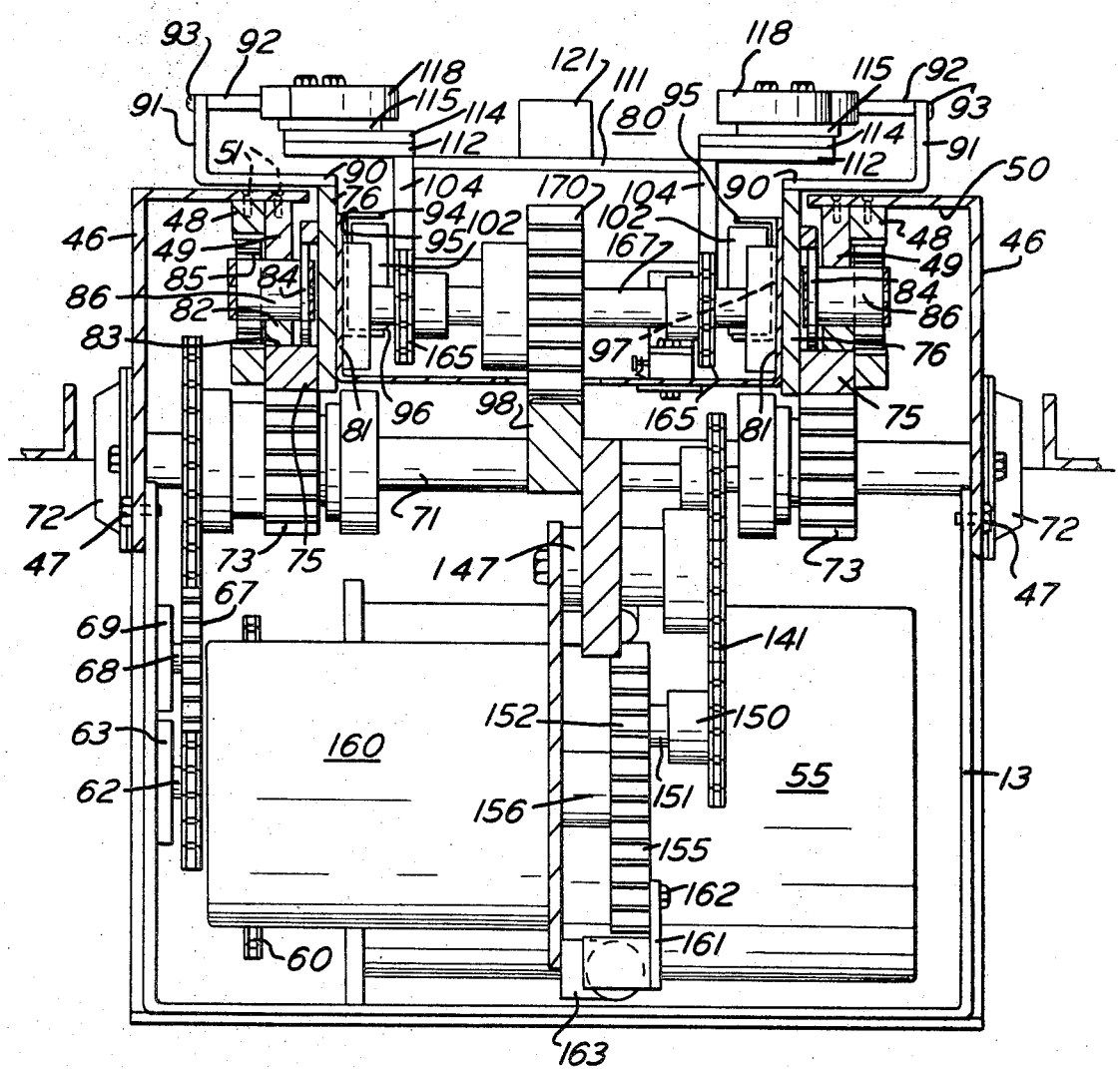
FIG. 6 is a vertical sectional view taken approximately on the line 6-6 of FIG. 5.

Referring now the to the other drawings and to FIG. 6, specifically, a machine frame 13 is provided with a pair of vertical upwardly extending L-shaped side plates 46 fastened thereto by bolts 47 extending lengthwise of the car 16 and joined at the ends by closure plates 28. Each of the plates 46 is provided with a fixed rack gear 48 and a guide bar 49 secured to the underside of the top portion 50 of the plate 46 by machine screws 51.

A main driving motor 55 is mounted on frame 17 with a shaft 56 extending therefrom having a sprocket gear 57 mounted on the shaft 56 at the outer end thereof. A chain 60 is engaged with the gear 57 and with a sprocket gear 61 mounted on a shaft 62 journaled in bearings 63 of frame 17.

The gear 61 has a gear 65 of smaller diameter secured to shaft 62 adjacent the gear 61 with a chain 66 engaged therewith and with a pair of sprocket gears 67 on shafts 68 journaled in bearings 69 of frame 17. The chain 66 extends to each end of machine frame 13 and engages a pair of sprocket gears 70 mounted on shafts 71 journaled in bearings 72 on plates 46.

A pair of gears 73 are provided on each of shafts 71 inside gears 70.

An additional shaft 74 is provided but which is an idler shaft and journaled in bearings 72 mounted on plates 46 and also having a pair of gears 73 thereon. The gears 73 are engaged with a pair of fixed offset double rack gears 75 mounted on vertical bars or plates 76 of a carriage 80.

The carriage 80 is carried by the machine frame 13 for horizontal movement for loading and unloading of the cart 21 from the car 16. The carriage 80 is of rectangular shape and has several L-shaped plates 81 connected to the plates 76 by any suitable means such as by welding.

The rack gears 75 have guide bars 82 on the top 83 extending therealong. Vertical plates 84 are mounted to the gears 75 and fastened at the top to the plates 76. A plurality of gears 85 are mounted on shafts 86 journaled in plate 84 engaged with each of the top 83 of the rack gears 75 and with the rack gear 48, to provide a support for the gears 75 and attached parts.

Each of the vertical plates 76 has a horizontal outwardly extending plate 90 integral therewith extending over the L-shaped side plates 46 with a vertical upwardly extending member 91 which has a horizontal inwardly extending guide plate 92 mounted thereon by screws 93.

At each side and inside of the plates 76 a pair of U-shaped trackways 94 are mounted each having an upper plate 95, lower rail 96 and connection portion 97.

A central fixed rack gear 98 is provided fastened at its ends to plates 28 of the frame 17, and extending lengthwise of the machine frame 13.

Figure 5:
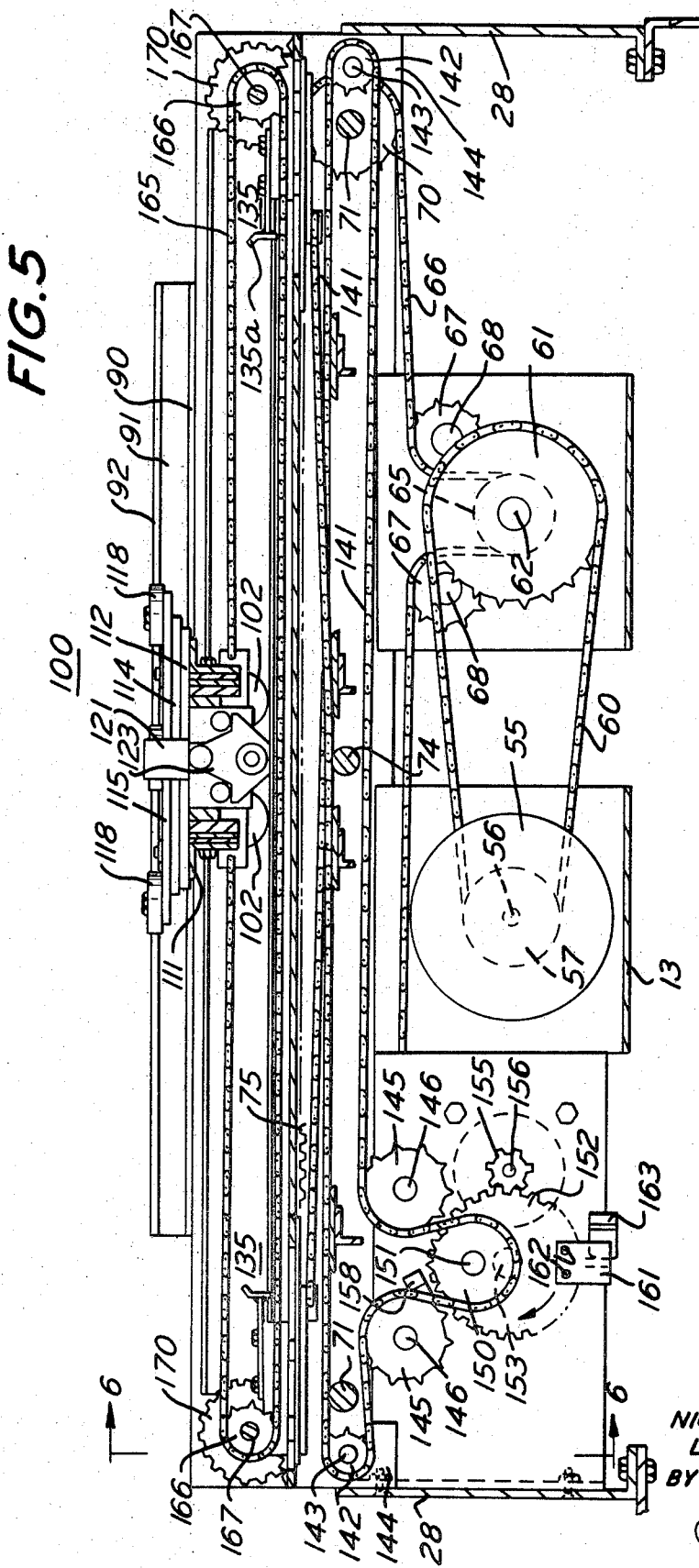
FIG. 5 is a vertical sectional view taken approximately on the line 5-5 of FIG. 2.
Figure 9:
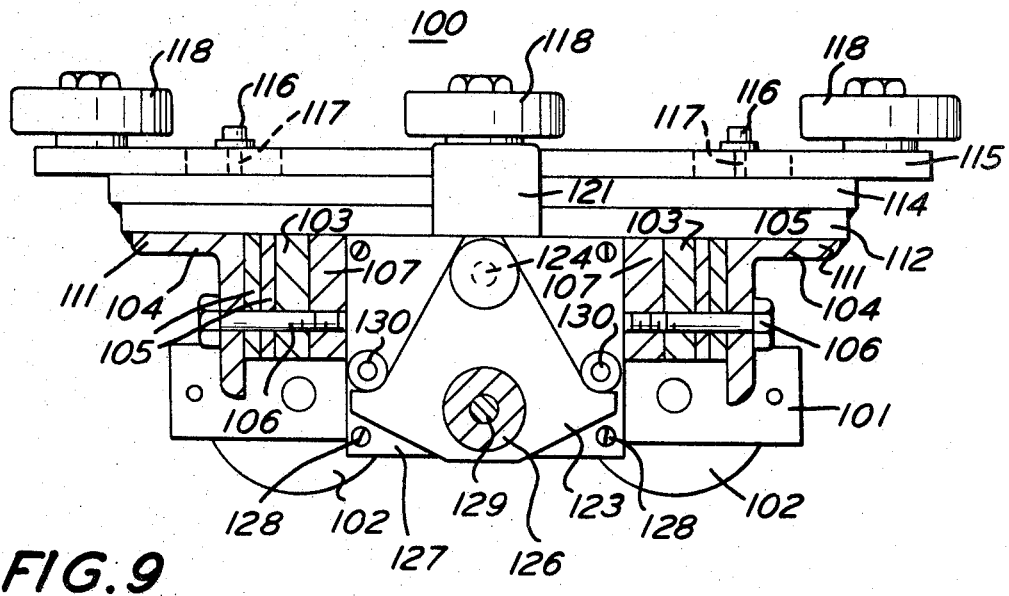
FIG. 9 is a vertical sectional view taken approximately on the line 9-9 of FIG. 8.

Referring more specifically to FIGS. 5, 8 and 9 of the drawings, the carriage 80 is there shown a cart engagement assembly 100 thereon. The assembly 100 is of essentially rectangular shape with two vertical side plates 101 and with four rollers 102 rotatably mounted thereon, the rollers 102 being engaged by the lower rails 96 of the trackways 94 and being free to move therealong. The plates 101 are connected at the front and rear by vertical plates 103 by any suitable means such as by welding. Outside of each plate 103 an L-shaped crosswise-extending plate 104 is provided with two shim plates 105 therebetween, the plates 103, 104 and 105 being held together by bolts 106 passing therethrough and threadably engaged in inner plates 107 secured to a central coupler bar block 110. The block 110 is of L-shape and open at the right side as seen in FIG. 8. The top portion 111 of the plates 104 have two ribs 112 connecting and securing them to two flat horizontal top plates 114. The plates 114 extend lengthwise of the assembly 100 each with a cart control bar 115 slidably mounted thereon by bolts 116 engaged in slots 117 in bar 115 and threadably engaged in plate 114. Each of the control bars 115 has three rollers 118 secured thereto and free to rotate. The center roller 118 is offset somewhat outwardly of the two which are at each end.

The coupler bar block 110 has a coupler bar 121 therein normally urged upwardly by a spring 122. The coupler bar 121 has an arm 123 connected thereto by a pin 124 which passes through a slot 125 in an arm mounting plate 127 and is free to move vertically therein.

The plate 127 closes the right side of block 110 and is secured thereto by bolts 128.

The arm 123 has a rocker-pin sleeve 126 fastened thereto at its lower end by a pin 129. The arm 123 is free to rotate about pin 124 and is restrained from vertical upward movement by two stop pins 130 engaged in the mounting plate 127.

Figure 7:
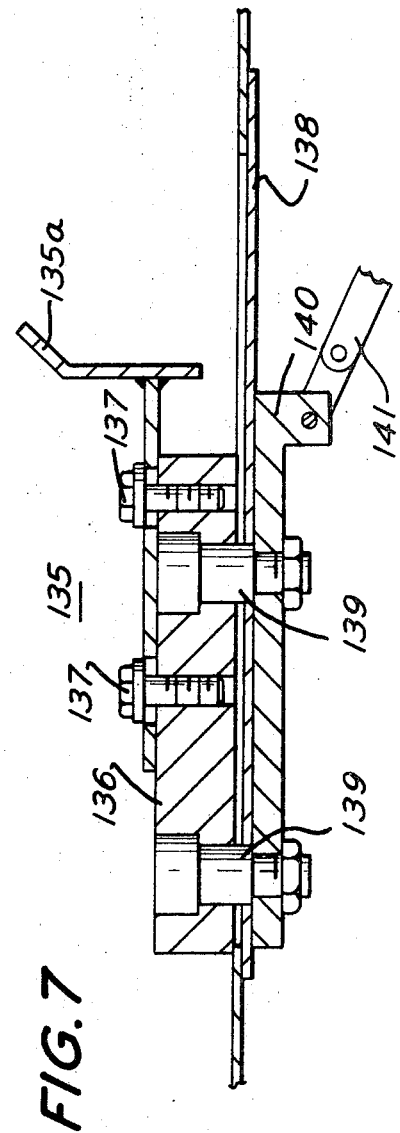
FIG. 7 is a vertical sectional view taken approximately on the line 7-7 of FIG. 2.
Figure 3:
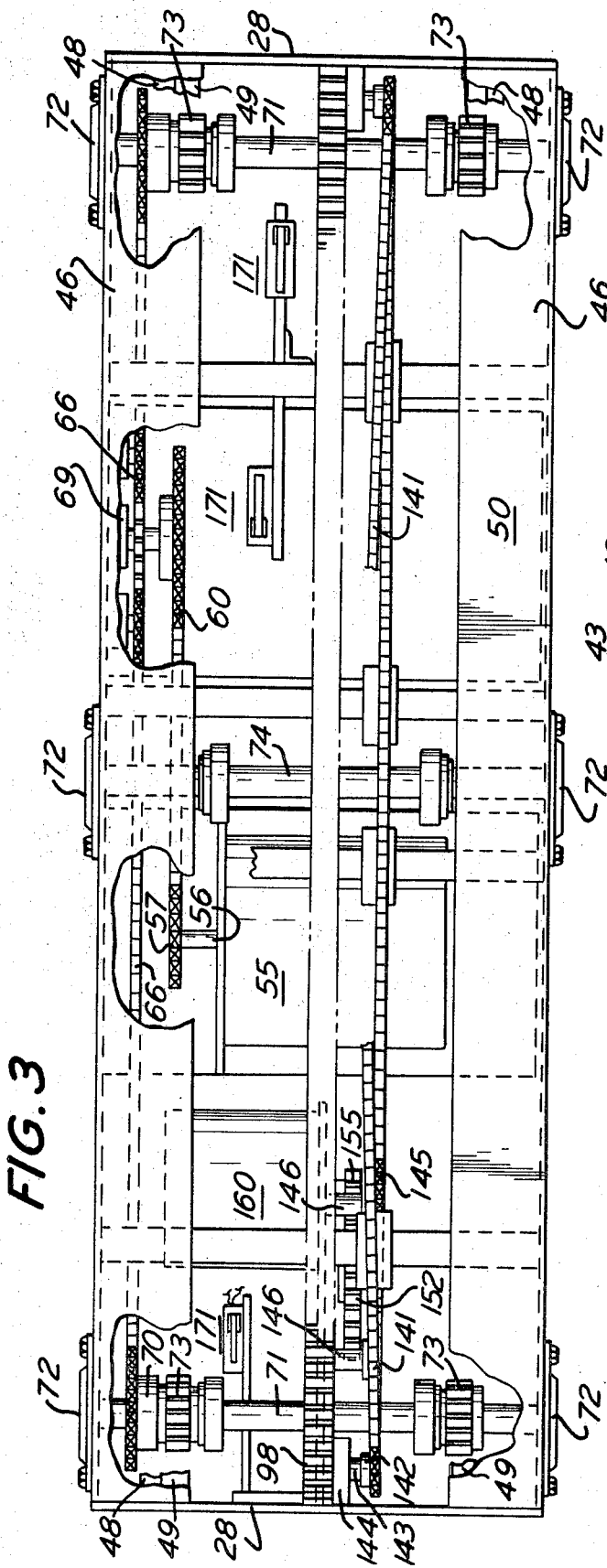
FIG. 3 is a horizontal sectional view taken approximately on the line 3-3 of FIG. 1.

A pair of cams 135 as shown more fully in FIG. 7 are provided at each end of the carriage 80 for actuation of the arm 123. The cams 135 are provided with cam fingers 135a and are mounted on blocks 136 by bolts 137, which blocks are mounted on slotted rail 138 which extends lengthwise of the carriage 80 and is secured to the plates 81. Two bolts 139 extend through the blocks 136 and hold angle brackets 140 on the bottom thereof below the rail 138. Springs 134 are provided engaged with plates 81 and cams 135 and normally urging the cams to an outward position.

Each of the brackets 140 has one end of a continuous chain 141 connected thereto which chain passes to the opposite end from the respective cam 135, and is engaged by idler gears 142 mounted on shafts 143 journaled in bearings 144 mounted on end plates 28. The chain 141 passes over a pair of sprocket gears 145 rotatably mounted on shafts 146 journaled in bearings 147 (see FIG. 6) mounted on frame 17, and around a gear 150 eccentrically rotatably mounted by shaft 151 to a large gear 152. The gear 152 is mounted on shaft 153 also journaled in bearings 147 on frame 17. A gear 155 engages the gear 152 and is mounted on shaft 156 of cam actuation motor 160, which is also mounted on frame 17.

A stop plate 161 is mounted on the lower part of gear 152 opposite to gear 150 by machine screws 162.

Stop brackets 163 and 158 mounted on frame 13 limit the movement of the stop plate 161.

A pair of chains 165 are provided on each side of assembly 100 engaged with the coupler bar block 110 at each end thereof and extending respectively to each end of the carriage 80 where they are engaged with a pair of sprocket gears 166.

The sprocket gears 166 are mounted on shafts 167 which are journaled in bearings 168 mounted on plates 81 backed up by bars 76 each shaft 167 having a centrally located gear 170 thereon for engagement of the fixed rack gear 98. A pair of limit switches 171 may be provided at each end of carriage 80 to prevent the carriage and assembly 100 from overtravel.

The mode of operation will now be pointed out.

Starting with the cart 21 at an access opening 12, say at the left and ready to be loaded onto a dumbwaiter car 16 the motor 55 is actuated. The shaft 56 revolves causing the gear 57 to move the chain 60 whereby the gear 61 is caused to rotate. The rotation of gear 61 causes gear 65 to move chain 66 to rotate gears 65, 67 and 70. The rotation of gear 70 on shaft 71 rotates gears 72 whereby the fixed rack gears 75 are caused to move outwardly thereby carrying carriage assembly 80 outwardly. The movement of carriage assembly 80 causes the gears 170 to be rotated due to their engagement with rack gear 98. The chains 165 are therefore moved by the rotation of sprockets 166 and the cart engagement assembly 100 is urged along trackways 94 out and under the coupler fitting 30 on the cart 21. As the assembly 100 moves under the coupler fitting 30, the coupler bar 121 is depressed by the wear plate 37 on the coupler fitting 30. The spring 122 is compressed as coupler bar 121 is pushed down, and when the coupler bar 121 reaches the opening 36 in the coupler fitting 30 the spring 122 pushes the coupler bar up into the opening 36, thus locking the cart to the coupler assembly 100.

At the same time the coupler assembly 100 is moving out to lock the coupler bar 121 into the coupler fitting 30, the center rollers 118 move beyond the face of each of the guide plates 92. This allows each of the end rollers 118 and the cart control bars 115 to move outwardly and adjust their positions to suit the location of the coupler fitting 30, even if the coupler fitting is at an angle to the path of motion of the coupler assembly 100. Once the coupler bar 121 engages the coupler fitting 30 the motor 55 is reversed and the cart 21 is pulled onto the dumbwaiter car 16. As the coupler assembly 100 moves toward the dumbwaiter car 16 the center roller 118 engages the guide plates 92 causing the end rollers 118 to contact the sides of the coupler fitting 30 to straighten and align the coupler fitting 30 and the cart 21 so the cart 21 moves in a straight line central with the carriage 80 and coupler assembly guides or trackways 94. Motion is continued until the cart 21 is in the center of car 16 when the motor 55 is stopped.

The car 16 can then be moved up or down to another location for unloading, and when the new location is reached the motor 55 is energized in its proper sequence and the cart 21 is pushed off the dumbwaiter car 16 toward either end. When the cart 21 has been moved out to its fully unloaded position, the coupler-bar-release motor 160 is energized. As motor 160 rotates it turns gear 155 which rotates gear 152 causing eccentric mounted shaft 151 to move down with its sprocket 150. This pulls chain 141 and simultaneously moves cam 135 along rails 138 so the cam 135 adjacent to rocker-pin sleeve 126 pushes rocker-pin sleeve 126 to turn rocker arm 123 against sleeve 130 and pulldown pin 124 and coupler bar 121 against spring 122, thus uncoupling the cart 21. While motor 160 is energized and coupler bar 121 held down, motor 55 is reversed to withdraw the carriage and coupler assembly 100. Motor 160 is then deenergized while motor 55 continues to turn until carriage 80 is in its center location ready for the next assignment.

It will thus be seen that apparatus has been provided with which the objectives of the invention are attached.

We claim:

1. A coupling mechanism for carts comprising:
a cart;
a coupling member on the cart;
a frame with respect to which said cart is to be positioned;
a carriage mounted on said frame and horizontally movable with respect thereto;
operating means for moving said carriage;
means on said carriage and engaging said coupling member for positively aligning said cart with respect to said carriage upon movement of said carriage;
said last mentioned means including:
fixed horizontally extending guide members on said carriage; latching mechanism carried by said carriage and having a latching member engageable with said coupling member; and
said latching mechanism having spaced, movable cart-control-bar members engaging said guide members and opposed portions of said coupling member and thereby impelling said coupling member to aligned position.

2. A coupling mechanism as defined in claim 1 in which latching-member-releasing members are provided for releasing said latching member upon movement of said latching member to the end of its path of movement.

3. A coupling member as defined in claim 2 in which:
said operating means for moving said carriage includes a driving motor;
said latch-member-releasing members have operating mechanism therefor; and
said operating mechanism includes a driving motor.

4. A coupling mechanism as defined in claim 1 in which:
releasing mechanism is provided for said latching member;
said releasing mechanism includes a slidably mounted downwardly movable arm, connected to said latching member; and
releasing members are provided selectively engageable with said arm for actuating the same.

5. A coupling mechanism as defined in claim 4 in which:
an operating chain is provided between said releasing members; and
actuating mechanism is provided for said chain.

6. A coupling mechanism as defined in claim 5 in which said actuating mechanism includes a motor driven gear with a sprocket engaging said chain eccentrically mounted on said gear.

7. A coupling mechanism as defined in claim 1 in which said cart-control-bar members include rollers engageable with said guide members.

8. A coupling member as defined in claim 1 in which:
said operating means for moving said carriage includes a driving motor; and
said latch member releasing members have operating mechanism therefor.